United States Patent
Sellers et al.

(10) Patent No.: US 12,531,454 B2
(45) Date of Patent: Jan. 20, 2026

(54) AIR COOLED ELECTRIC MOTOR HAVING AN INCREASED AIRFLOW AND A METHOD FOR INCREASING THE AIRFLOW THEREIN

(71) Applicant: Hamilton Sundstrand Corporation, Charlotte, NC (US)

(72) Inventors: Benjamin Sellers, Mt. Airy, MD (US); Christopher Simpson, West Hartford, CT (US); Zachary Alex Schuster, Chicago, IL (US); Jeremy Clavette, Farmington, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 259 days.

(21) Appl. No.: 18/239,639

(22) Filed: Aug. 29, 2023

(65) Prior Publication Data

US 2025/0079930 A1    Mar. 6, 2025

(51) Int. Cl.
*H02K 5/20*    (2006.01)

(52) U.S. Cl.
CPC .................... *H02K 5/207* (2021.01)

(58) Field of Classification Search
CPC ............ H02K 5/00; H02K 5/207; H02K 5/20; H02K 5/04; H02K 9/00
USPC ....................................................... 310/60 A
See application file for complete search history.

(56) References Cited

U.S. PATENT DOCUMENTS

| | | | |
|---|---|---|---|
| 7,302,804 B2 | 12/2007 | Murry et al. | |
| 8,863,548 B2 * | 10/2014 | Hipsky | B64D 13/06 62/505 |
| 9,243,643 B2 * | 1/2016 | Beers | F04D 29/584 |
| 9,862,493 B2 | 1/2018 | Beers et al. | |
| 11,143,203 B2 | 10/2021 | Merritt et al. | |
| 11,261,880 B2 | 3/2022 | Merritt et al. | |
| 11,365,742 B2 | 6/2022 | Pal et al. | |

(Continued)

FOREIGN PATENT DOCUMENTS

| | | |
|---|---|---|
| EP | 3173336 A1 | 5/2017 |
| WO | 2020052011 A1 | 3/2020 |

OTHER PUBLICATIONS

European Search Report for Application No. 24197092.0, mailed Jan. 31, 2025, 8 pages.

*Primary Examiner* — Alexander A Singh
*Assistant Examiner* — Charlie Frank Mann, Jr.
(74) *Attorney, Agent, or Firm* — CANTOR COLBURN LLP

(57) ABSTRACT

A method for increasing stator cooling airflow in an air cooled electric motor is provided, wherein the air cooled electric motor includes a compressor outlet housing having a motor cavity separator wall and a separator plate defining a separator plate opening, wherein the compressor outlet housing defines a separator plate cavity and a compressor rotor back-face cavity configured to receive a back-face cavity airflow. The motor cavity separator wall separates the separator plate cavity from the compressor rotor back-face cavity and defines a motor cavity separator wall through-hole which communicates the separator plate cavity with the compressor rotor back-face cavity and a motor cooling housing including a motor cooling outlet structure which defines a stator outlet cavity, wherein the separator plate is disposed to separate the stator outlet cavity from the separator plate cavity.

20 Claims, 3 Drawing Sheets

(56) References Cited

U.S. PATENT DOCUMENTS

| | | | |
|---|---|---|---|
| 11,530,705 B2 | 12/2022 | Beers | |
| 2006/0067833 A1* | 3/2006 | McAuliffe | F04D 29/584 |
| | | | 417/43 |
| 2014/0357176 A1* | 12/2014 | Beers | B64D 13/06 |
| | | | 454/76 |
| 2016/0218590 A1 | 7/2016 | Oxman et al. | |
| 2017/0175748 A1* | 6/2017 | Pal | F04D 25/082 |

* cited by examiner

AIR COOLED ELECTRIC MOTOR HAVING AN INCREASED AIRFLOW AND A METHOD FOR INCREASING THE AIRFLOW THEREIN

BACKGROUND

Large commercial aircraft, such as the Boeing 787, routinely fly at heights that reach 36,000 feet or more. At that height the air is very thin and the aircraft needs to be pressurized to allow passengers to safely travel within the cabin. Accordingly, these aircraft have an Environmental Control System (ECS) which maintains an atmosphere within the cabin that allows passengers to have a safe, comfortable and pleasant flight. In order to accomplish this, the ECS includes an air-conditioning system which uses an air compressor that is powered by an electric motor. This is because the cabin air is not drawn from the jet engines under pressure. Rather, the cabin air is fresh air from the outside atmosphere and must be conditioned and prepared for use within the cabin.

Generally, such an electric motor works by converting electrical energy into mechanical energy by using the interaction of a magnetic field and an electrical current that is flowing through a wire winding to generate torque, or rotation, on a motor shaft. The torque of the motor shaft is then used to perform desired functions, such as the operation of the air compressor for the generation of compressed air. A stator is a stationary component located within the compressor outlet housing that typically includes a laminated core and coils of insulated wire, or windings. When a current is applied to the stator, a rotating magnetic field is created. Stator motors utilize the electric current flowing through its copper wire windings to generate the rotational torque on the compressor shaft. This electric current generates a significant amount of heat that needs to be removed or rejected out of the windings and through the stator housing. One way to reject this generated heat is to direct a cooling airflow over the stator outer diameter to cool the stator. Unfortunately, however, cooling airflow is limited around the stator by current design deficiencies which lead to overheating and Cabin Air Compressor (CAC) operational failures.

SUMMARY

Disclosed is an air cooled electric motor, which includes a compressor outlet housing, wherein the compressor outlet housing includes a motor cavity separator wall and a separator plate defining a separator plate opening and a separator plate cavity, wherein the compressor outlet housing defines a separator plate cavity and a compressor rotor back-face cavity configured to receive a back-face cavity airflow, and wherein the motor cavity separator wall separates the separator plate cavity from the compressor rotor back-face cavity and defines at least one motor cavity separator wall through-hole which communicates the compressor rotor back-face cavity with the separator plate cavity and a motor cooling housing including a motor cooling outlet structure which defines a motor cooling outlet structure inlet, a motor cooling outlet, a stator motor cooling flow path and a stator outlet cavity, wherein the stator outlet cavity communicates the stator motor cooling flow path with the motor cooling outlet structure inlet, and wherein the separator plate is disposed to separate the stator outlet cavity from the separator plate cavity, and wherein the separator plate opening is configured to allow the back-face cavity airflow to flow into the stator outlet cavity and into the motor cooling outlet structure inlet.

In addition to one or more of the features described above, or as an alternative to any of the foregoing embodiments, wherein the at least one motor cavity separator wall through-hole includes a plurality of motor cavity separator wall through-holes.

In addition to one or more of the features described above, or as an alternative to any of the foregoing embodiments, wherein the separator plate is disposed to create high pressure area within the separator plate cavity and a low pressure area proximate the stator outlet cavity.

In addition to one or more of the features described above, or as an alternative to any of the foregoing embodiments, where the compressor rotor back-face cavity is communicated with a compressor seal to receive a motor seal airflow leakage.

In addition to one or more of the features described above, or as an alternative to any of the foregoing embodiments, wherein the compressor rotor back-face cavity is further communicated with a bearing cooling airflow path to receive a bearing cooling airflow.

In addition to one or more of the features described above, or as an alternative to any of the foregoing embodiments, wherein the compressor rotor back-face cavity is configured to combine the motor seal airflow leakage and the bearing cooling airflow to create the back-face cavity airflow.

In addition to one or more of the features described above, or as an alternative to any of the foregoing embodiments, wherein the at least one motor cavity separator wall through-hole includes a motor cavity separator wall through-hole total cross-sectional area, and wherein the separator plate opening includes a separator plate opening total cross-sectional area.

In addition to one or more of the features described above, or as an alternative to any of the foregoing embodiments, wherein the separator plate opening total cross-sectional area is less than or equal to the motor cavity separator wall through-hole total cross-sectional area.

Further disclosed is an electric compressor motor which includes compressor outlet housing, wherein the compressor outlet housing includes a motor cavity separator wall and a separator plate defining a separator plate cavity and a separator plate opening having a separator plate opening cross-sectional area, wherein the compressor outlet housing defines a compressor rotor back-face cavity configured to receive a back-face cavity airflow, and wherein the motor cavity separator wall separates the separator plate cavity from the compressor rotor back-face cavity and defines a motor cavity separator wall through-hole which communicates the compressor rotor back-face cavity with the separator plate cavity, wherein the motor cavity separator wall through-hole includes a motor cavity separator wall through-hole cross-sectional area, wherein the separator plate opening cross-sectional area is less than or equal to the motor cavity separator wall through-hole cross-sectional area, and a motor cooling housing including a motor cooling outlet structure which defines a stator outlet cavity, wherein the separator plate is disposed to separate the stator outlet cavity from the separator plate cavity In addition to one or more of the features described above, or as an alternative to any of the foregoing embodiments, wherein the separator plate opening is configured to allow the back-face cavity airflow to flow into the stator outlet cavity.

In addition to one or more of the features described above, or as an alternative to any of the foregoing embodiments, wherein the motor cavity separator wall through-hole includes a plurality of motor cavity separator wall through-holes.

In addition to one or more of the features described above, or as an alternative to any of the foregoing embodiments, wherein the separator plate is disposed to create a high pressure area within the separator plate cavity and a low pressure area proximate the stator outlet cavity.

In addition to one or more of the features described above, or as an alternative to any of the foregoing embodiments, wherein the compressor rotor back-face cavity is communicated with a compressor seal to receive a motor seal airflow leakage.

In addition to one or more of the features described above, or as an alternative to any of the foregoing embodiments, wherein the compressor rotor back-face cavity is further communicated with a bearing cooling airflow path to receive a bearing cooling airflow.

In addition to one or more of the features described above, or as an alternative to any of the foregoing embodiments, wherein the compressor rotor back-face cavity is configured to combine the motor seal airflow leakage and the bearing cooling airflow to create the back-face cavity airflow.

In addition to one or more of the features described above, or as an alternative to any of the foregoing embodiments, wherein the motor cooling outlet structure includes a motor cooling outlet, wherein the stator outlet cavity communicates a stator motor cooling flow path with the motor cooling outlet.

A method for increasing stator cooling airflow in an electric compressor motor having a compressor outlet housing and a motor cooling housing, wherein the compressor outlet housing includes a motor cavity separator wall and defines a separator plate cavity and a compressor rotor back-face cavity and wherein the motor cooling housing defines a motor cooling outlet and includes a stator outlet cavity, the method comprising: separating the stator outlet cavity from the compressor rotor back-face cavity via the motor cavity separator wall, wherein the motor cavity separator wall defines one or more motor cavity separator wall through-holes which communicate the compressor rotor back-face cavity with the separator plate cavity; and disposing the separator plate between the motor cavity separator wall and the stator outlet cavity to enclose the separator plate cavity located between the separator plate and the motor cavity separator wall, wherein the separator plate defines a separator plate opening which communicates the separator plate cavity with the stator outlet cavity.

In addition to one or more of the features described above, or as an alternative to any of the foregoing embodiments, wherein the compressor rotor back-face cavity is configured to receive a compressor seal airflow leakage and a bearing cooling airflow, and wherein the compressor seal airflow leakage and the bearing cooling airflow are combined within the compressor rotor back-face cavity to create the back-face cavity airflow.

In addition to one or more of the features described above, or as an alternative to any of the foregoing embodiments, wherein the separator plate opening includes a separator plate opening cross sectional area and the one or more motor cavity separator wall through-hole includes a motor cavity separator wall through-hole cross-sectional area, and wherein the separator plate opening cross sectional area is less than or equal to the motor cavity separator wall through-hole cross-sectional area.

In addition to one or more of the features described above, or as an alternative to any of the foregoing embodiments, wherein the separator plate is disposed to create a high pressure area within the separator plate cavity and a low pressure area proximate the stator outlet cavity.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the several Figures. In accordance with an embodiment, the present invention provides a separator plate for use with an air cooled electric motor of an ECS compressor to utilize compressor seal leakage and bearing cooling flow as a second airflow stream, wherein the second airflow stream is injected into the motor cooling outlet port at a higher velocity than the base cooling flow to increase the overall cooling flow. The momentum from the second airflow stream 'pulls' air through the motor stator thereby increasing the total stator cooling mass airflow. Essentially, the method 'utilizes' a weak ejector effect to create a low pressure area around the stator heat exchanger exit. It should be appreciated that the method and design of the invention, increases the stator cooling airflow while having no negative impact on the performance of the CAC and/or the aircraft ECS. As such, the invention accomplishes an increased stator cooling airflow using a low weight design that will have no negative impact on the CAC aircraft interface and the CAC air supply to the aircraft, and that does not increase CAC power consumption. In an embodiment, the invention may provide an increase in motor airflow of about 10% over current methods while separating the higher temperature seal leakage airflow from the motor stator plenum (i.e., stator outlet cavity).

Figure 1:
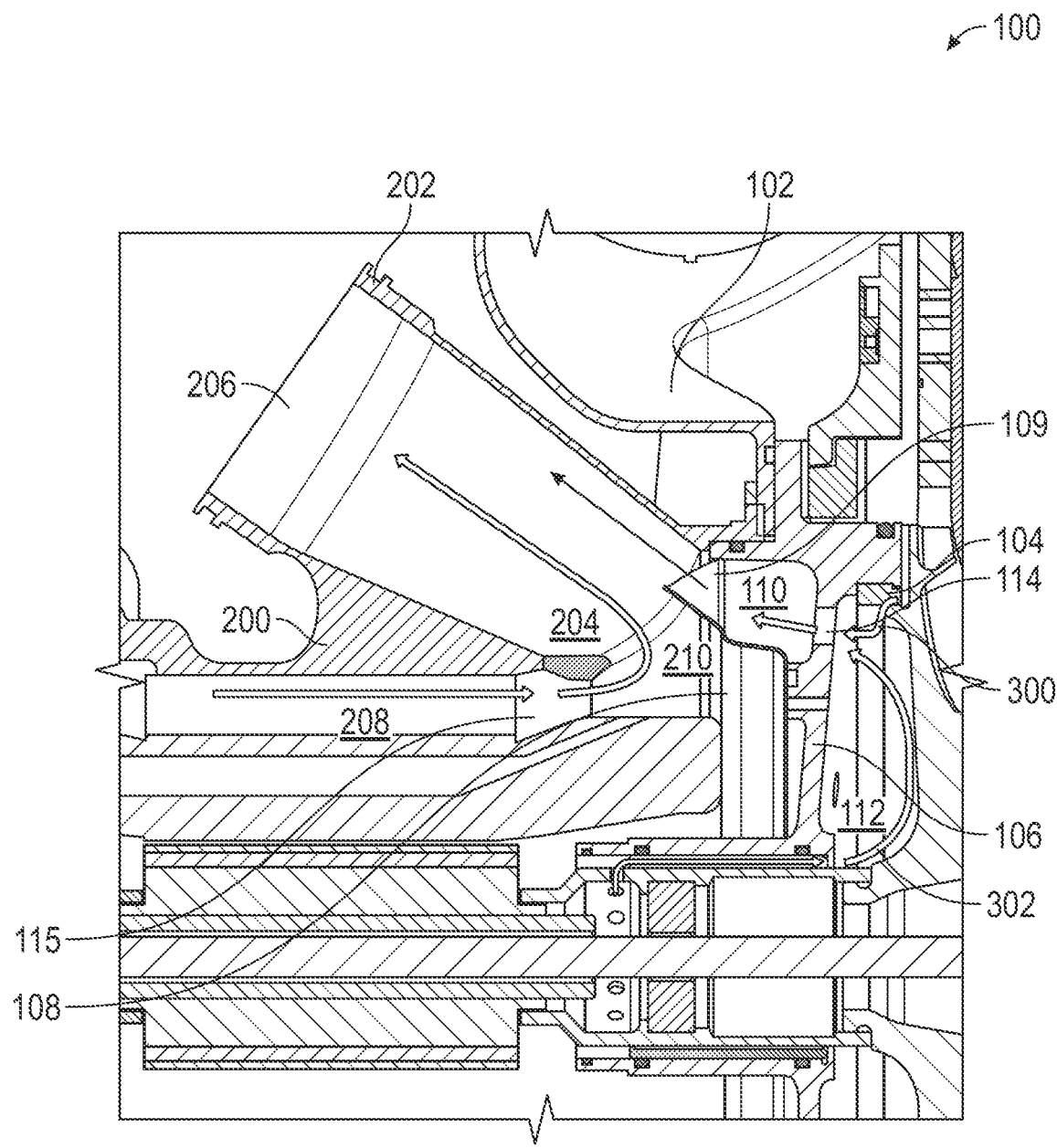
FIG. 1 is a sectional view of an electric compressor motor and a motor cooling housing having increased stator cooling airflow, in accordance with an embodiment.
Figure 2:
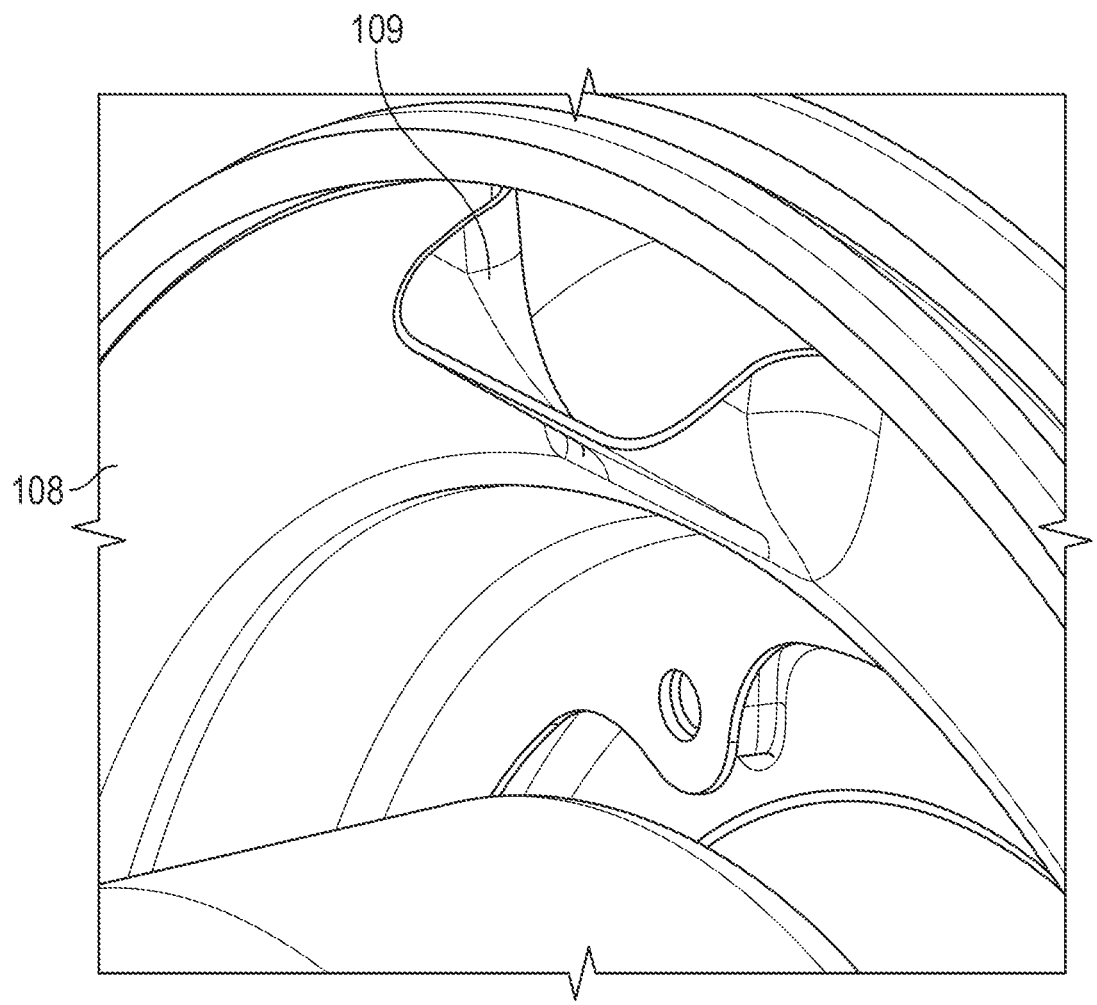
FIG. 2 is a front view of a separator plate used in the electric compressor motor of FIG. 1, in accordance with an embodiment.
Figure 3:
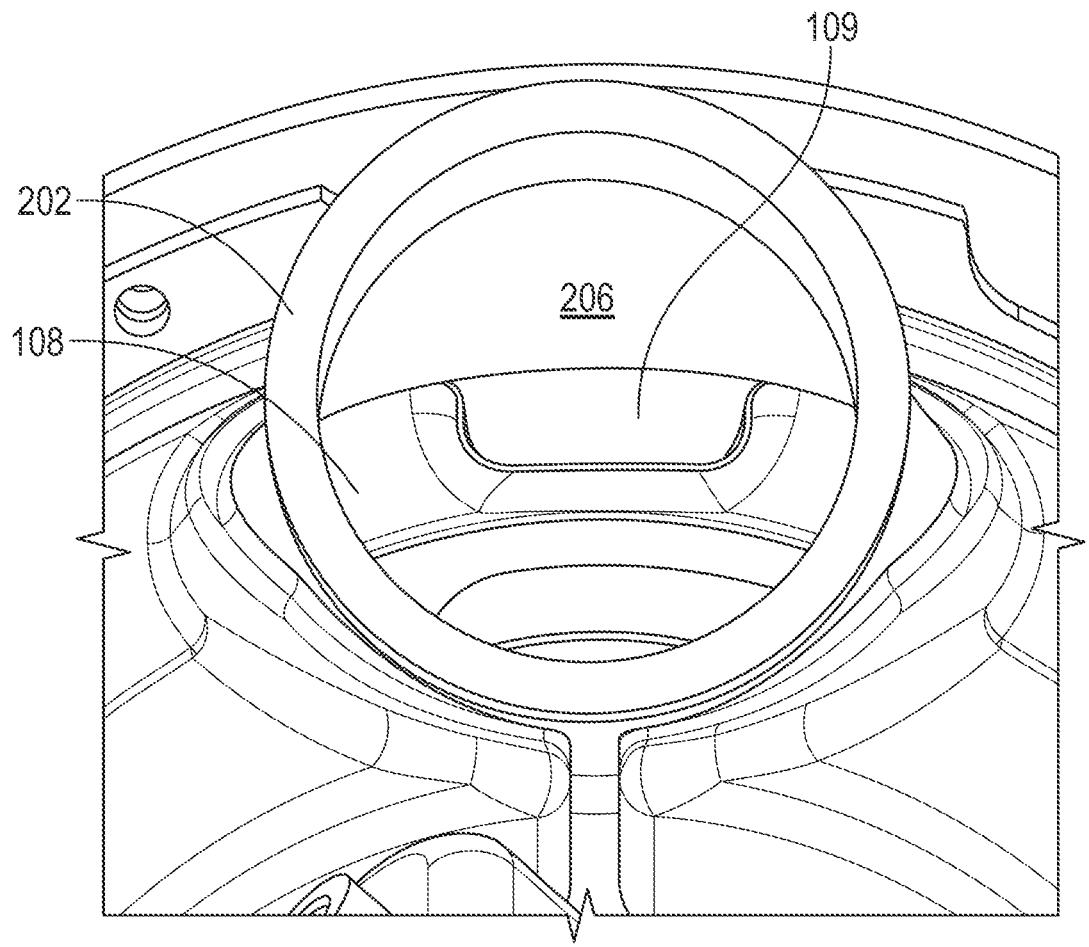
FIG. 3 is a front view of a motor cooling outlet of a motor cooling outlet structure electric compressor motor of FIG. 1, in accordance with an embodiment.

Referring to FIG. 1, FIG. 2 and FIG. 3, a sectional view of an air cooled electric motor 100 and a motor cooling housing 200 is shown, in accordance with an embodiment. The air cooled electric motor 100 includes a compressor outlet housing 102 which includes a compressor seal 104, a motor cavity separator wall 106 and a separator plate 108 which defines a separator plate opening 109. The compressor outlet housing 102 defines a separator plate cavity 110 and a compressor rotor back-face cavity 112. The motor cavity separator wall 106 is disposed to separate the separator plate cavity 110 from the compressor rotor back-face cavity 112, wherein the motor cavity separator wall 106 defines one or more motor cavity separator wall through-holes 114 which communicate the separator plate cavity 110 with the compressor rotor back-face cavity 112. It should be appreciated that the motor cavity separator wall 106 also separates the bearing cooling and seal leakage flow from the stator outlet flow. The separator plate 108 further separates this flow from the stator outlet flow until it is far enough downstream that it no longer inhibits the stator cooling flow. The separator plate 108 also introduces the ejector effect, referenced hereinabove, to create a low pressure area around the stator heat exchanger exit 115.

The one or more motor cavity separator wall through-holes 114 allow the airflow to travel between the compressor rotor back-face cavity 112 and the separator plate cavity 110. The motor cooling housing 200 includes a motor cooling outlet structure 202 which defines a motor cooling outlet structure inlet 204, a motor cooling outlet 206, a stator motor cooling flow path 208 and a stator outlet cavity 210, wherein the stator outlet cavity 210 communicates the stator motor cooling flow path 208 with the motor cooling outlet structure inlet 204. The separator plate 108 is disposed to separate the stator outlet cavity 210 from the separator plate cavity 110 and also acts to direct the stator motor cooling flow path 208 into the motor cooling outlet structure inlet 204.

Accordingly, the invention allows for the compressor seal leakage airflow 300 and the bearing cooling airflow 302 to be combined within the compressor bearing back-face cavity 112 before flowing through the one or more motor cavity separator wall through-holes 114, into the separator plate cavity 110 and injected into the stator outlet cavity 210 via the separator plate opening 109 which communicates the separator plate cavity 110 with the stator outlet cavity 210. Once in the stator outlet cavity 210, the airflow is further combined with the stator motor cooling airflow that is flowing into the stator outlet cavity 210 from the stator motor cooling flow path 208. The combination airflow is then pulled into the motor cooling outlet structure inlet 204 and out of the motor cooling outlet 206.

It should be appreciated that the separator plate opening 109 should be sized such that the total cross-sectional area of the separator plate opening 109 is less than or equal to the total cross-sectional area of the one or more separator wall through-holes 114. This keeps the pressure within the separator plate cavity 110 higher than the pressure within the stator outlet cavity 210 to drive a higher exit velocity of the airflow out of the separator plate opening 109 and into the stator outlet cavity 210 thereby increasing the ejector effect. By controlling the size of the cavity openings (i.e., separator plate opening 109, motor cavity separator wall through-holes 114, etc.) the pressure control and airflow rate velocity may be controlled. Moreover, in an embodiment, the shape of the separator plate opening 109 and/or the positioning of the one or more motor cavity separator wall through-holes 114 may also be configured to improve the performance of the ejector effect. It should be appreciated that the size and number of separator wall through-holes 114 and the size of the separator plate opening 109 may be different for each application. The size and number of separator wall through-holes 114 may be determined through an iterative process that defines the total cross sectional area as a function of inlet flow rates and cavity pressures with considerations being made for aerodynamic thrust loads and the structural capabilities of the assembly. Similarly, the size of the separator plate opening 109 may be determined through an iterative process that defines the total cross sectional area as a function of inlet flow rates, cavity pressures, and desired flow velocities.

Figure 4:
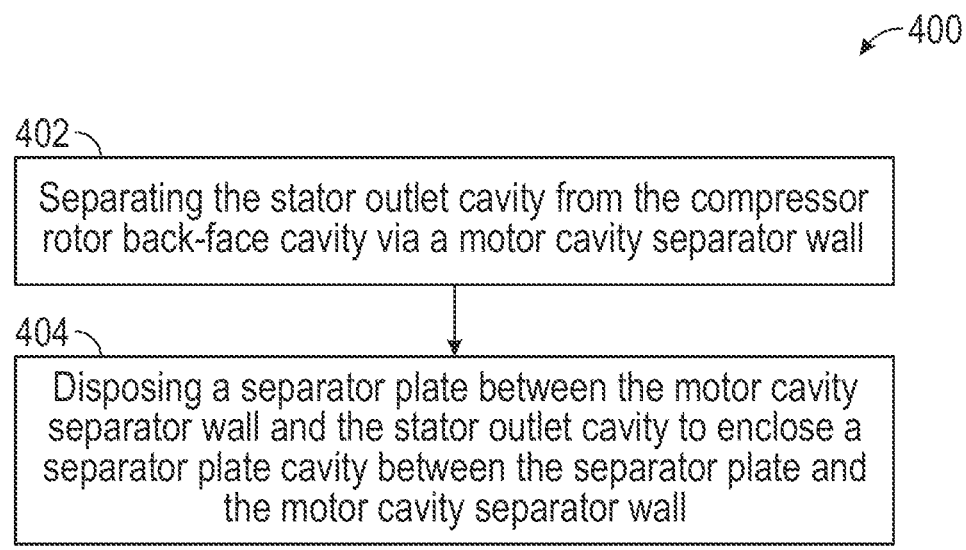
FIG. 4 is an operational block diagram illustrating a method for increasing stator cooling airflow in an electric compressor motor is shown, in accordance with an embodiment.

Referring to FIG. 4, an operational block diagram illustrating a method 400 for increasing stator cooling airflow in an air cooled electric motor 100 is shown, in accordance with an embodiment. The method 400 includes separating the stator outlet cavity 210 from the compressor rotor back-face cavity 112 via a motor cavity separator wall 106, as shown in operational block 402, wherein the motor cavity separator wall 106 defines one or more motor cavity separator wall through-holes 114. A separator plate 108 is securely disposed proximate the motor cavity separator wall 106 to separate the motor cavity separator wall 106 from the stator outlet cavity 210 and to create a separator plate cavity 110 between the separator plate 108 and the motor cavity separator wall 106, as shown in operational block 404. The separator plate 108 defines a separator plate opening 109 which communicates the separator plate cavity 110 with the stator outlet cavity 210 and the motor cooling outlet structure inlet 204. The compressor rotor back-face cavity 112 is in flow communication with the separator plate cavity 110 via the one or more motor cavity separator wall through-holes 114, and the separator plate cavity 110 is in flow communication with the stator outlet cavity 210 via the separator plate opening 109.

Moreover, as discussed above, the separator plate opening 109 should be sized such that the total cross-sectional area of the separator plate opening 109 is less than or equal to the total cross-sectional area of the one or more motor cavity separator wall through-holes 114. It should be appreciated that the invention allows the compressor seal leakage airflow 300 and the bearing cooling airflow 302 to be combined in the compressor rotor back-face cavity 112, communicated to the separator plate cavity 110 via the one or more motor cavity separator wall through-holes 114 and communicated into the stator outlet cavity 210 via the separator plate opening 109, wherein the velocity of air exiting the motor cooling outlet 206 creates a lower pressure region behind the stator which increases the stator Outer Diameter (OD) airflow.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. Moreover, the embodiments or parts of the embodiments may be combined in whole or in part without departing from the scope of the invention. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this disclosure, but that the present disclosure will include all embodiments falling within the scope of the claims.

What is claimed is:

1. An air cooled electric motor, comprising:
a compressor outlet housing, wherein the compressor outlet housing includes a motor cavity separator wall and a separator plate defining a separator plate opening and a separator plate cavity,
wherein the compressor outlet housing defines a compressor rotor back-face cavity configured to receive a back-face cavity airflow, and
wherein the motor cavity separator wall separates the separator plate cavity from the compressor rotor back-face cavity and defines at least one motor cavity separator wall through-hole which communicates the compressor rotor back-face cavity with the separator plate cavity; and
a motor cooling housing including a motor cooling outlet structure which defines a motor cooling outlet structure inlet, a motor cooling outlet, a stator motor cooling flow path and a stator outlet cavity, wherein the stator outlet cavity communicates the stator motor cooling flow path with the motor cooling outlet structure inlet, and
wherein the separator plate is disposed to separate the stator outlet cavity from the separator plate cavity, and wherein the separator plate opening is configured to allow the back-face cavity airflow to flow into the stator outlet cavity and into the motor cooling outlet structure inlet.

2. The air cooled electric motor of claim 1, wherein the at least one motor cavity separator wall through-hole includes a plurality of motor cavity separator wall through-holes.

3. The air cooled electric motor of claim 1, wherein the separator plate is disposed to create a high pressure area within the separator plate cavity and a low pressure area proximate the stator outlet cavity.

4. The air cooled electric motor of claim 1, where the compressor rotor back-face cavity is communicated with a compressor seal to receive a motor seal airflow leakage.

5. The air cooled electric motor of claim 4, wherein the compressor rotor back-face cavity is further communicated with a bearing cooling airflow path to receive a bearing cooling airflow.

6. The air cooled electric motor of claim 5, wherein the compressor rotor back-face cavity is configured to combine the motor seal airflow leakage and the bearing cooling airflow to create the back-face cavity airflow.

7. The air cooled electric motor of claim 1, wherein the at least one motor cavity separator wall through-hole includes a motor cavity separator wall through-hole total cross-sectional area, and wherein the separator plate opening includes a separator plate opening total cross-sectional area.

8. The air cooled electric motor of claim 1, wherein the separator plate opening total cross-sectional area is less than or equal to the motor cavity separator wall through-hole total cross-sectional area.

9. An air cooled electric motor, comprising:
a compressor outlet housing, wherein the compressor outlet housing includes a motor cavity separator wall and a separator plate defining a separator plate cavity and a separator plate opening having a separator plate opening cross-sectional area,
wherein the compressor outlet housing defines a compressor rotor back-face cavity configured to receive a back-face cavity airflow, and
wherein the motor cavity separator wall separates the separator plate cavity from the compressor rotor back-face cavity and defines a motor cavity separator wall through-hole which communicates the compressor rotor back-face cavity with the separator plate cavity, wherein the motor cavity separator wall through-hole includes a motor cavity separator wall through-hole cross-sectional area, wherein the separator plate opening cross-sectional area is less than or equal to the motor cavity separator wall through-hole cross-sectional area; and
a motor cooling housing including a motor cooling outlet structure which defines a stator outlet cavity, wherein the separator plate is disposed to separate the stator outlet cavity from the separator plate cavity.

10. The air cooled electric motor of claim 9, wherein the separator plate opening is configured to allow the back-face cavity airflow to flow into the stator outlet cavity.

11. The air cooled electric motor of claim 9, wherein the motor cavity separator wall through-hole includes a plurality of motor cavity separator wall through-holes.

12. The air cooled electric motor of claim 9, wherein the separator plate is disposed to create a high pressure area within the separator plate cavity and a low pressure area proximate the stator outlet cavity.

13. The air cooled electric motor of claim 9, wherein the compressor rotor back-face cavity is communicated with a compressor seal to receive a motor seal airflow leakage.

14. The air cooled electric motor of claim 13, wherein the compressor rotor back-face cavity is further communicated with a bearing cooling airflow path to receive a bearing cooling airflow.

15. The air cooled electric motor of claim 14, wherein the compressor rotor back-face cavity is configured to combine the motor seal airflow leakage and the bearing cooling airflow to create the back-face cavity airflow.

16. The air cooled electric motor of claim 9, wherein the motor cooling outlet structure includes a motor cooling outlet, and wherein the stator outlet cavity communicates a stator motor cooling flow path with the motor cooling outlet.

17. A method for increasing stator cooling airflow in an air cooled electric motor having a compressor outlet housing and a motor cooling housing, wherein the compressor outlet housing includes a motor cavity separator wall and defines a separator plate cavity and a compressor rotor back-face cavity and wherein the motor cooling housing defines a motor cooling outlet and includes a stator outlet cavity, the method comprising:
separating the stator outlet cavity from the compressor rotor back-face cavity via the motor cavity separator wall, wherein the motor cavity separator wall defines one or more motor cavity separator wall through-holes which communicate the compressor rotor back-face cavity with the separator plate cavity; and
disposing a separator plate between the motor cavity separator wall and the stator outlet cavity to enclose the separator plate cavity located between the separator plate and the motor cavity separator wall, wherein the separator plate defines a separator plate opening which communicates the separator plate cavity with the stator outlet cavity.

18. The method of claim 17,
wherein the compressor rotor back-face cavity is configured to receive a compressor seal airflow leakage and a bearing cooling airflow, and
wherein the compressor seal airflow leakage and the bearing cooling airflow are combined within the compressor rotor back-face cavity to create the back-face cavity airflow.

19. The method of claim 17,
wherein the separator plate opening includes a separator plate opening cross sectional area and the one or more motor cavity separator wall through-hole includes a motor cavity separator wall through-hole cross-sectional area, and
wherein the separator plate opening cross sectional area is less than or equal to the motor cavity separator wall through-hole cross-sectional area.

20. The method of claim 17, wherein the separator plate is disposed to create a high pressure area within the separator plate cavity and a low pressure area proximate the stator outlet cavity.

\* \* \* \* \*